US007971490B2

(12) United States Patent
Fleury et al.

(10) Patent No.: US 7,971,490 B2
(45) Date of Patent: Jul. 5, 2011

(54) LOAD MEASUREMENT METHOD AND DEVICE

(75) Inventors: Byron A. Fleury, Lynchburg, VA (US); Daniel J. Morris, Forest, VA (US); William C. Hooss, Rustburg, VA (US)

(73) Assignee: Flowserve Management Company, Irving, TX (US)

( * ) Notice: Subject to any disclaimer, the term of this patent is extended or adjusted under 35 U.S.C. 154(b) by 195 days.

(21) Appl. No.: 12/224,746

(22) PCT Filed: Mar. 3, 2006

(86) PCT No.: PCT/US2006/008030
§ 371 (c)(1), (2), (4) Date: Dec. 16, 2008

(87) PCT Pub. No.: WO2007/100338
PCT Pub. Date: Sep. 7, 2007

(65) Prior Publication Data

US 2010/0005897 A1 Jan. 14, 2010

(51) Int. Cl.
*G01B 7/16* (2006.01)

(52) U.S. Cl. .......................................... 73/781; 73/760

(58) Field of Classification Search ............. 73/760–781
See application file for complete search history.

(56) References Cited

U.S. PATENT DOCUMENTS 3,676,818 A * 7/1972 Oliver ............................... 338/2
3,778,122 A * 12/1973 Doll et al. .................... 310/90.5
4,168,160 A 9/1979 Stoferle et al.
4,182,168 A 1/1980 Desch
4,281,537 A * 8/1981 Burbank, III ............ 73/862.331
4,589,782 A * 5/1986 Park ................................ 374/14
4,651,569 A * 3/1987 Paros et al. ..................... 73/704
4,735,102 A * 4/1988 Koenig .................... 73/862.474
4,953,412 A * 9/1990 Rosenberg et al. .......... 73/865.8
5,353,514 A * 10/1994 McMurtry ...................... 33/559

(Continued)

FOREIGN PATENT DOCUMENTS

GB 1 566 906 5/1980

OTHER PUBLICATIONS

Examination Report under Section 18(3), dated Sep. 30, 2009, in Application No. GB0816080.6 (3 pages).

(Continued)

*Primary Examiner* — Max Noori
(74) *Attorney, Agent, or Firm* — TraskBritt

(57) ABSTRACT

A device for axial load measurement on a mechanical control device (10) having rotating shaft (30) maybe used to derive a torque measurement. A mechanical control device (10) may comprise a valve actuator for fluid flow control devices. The load measurement device may include a beam (65*a*) operatively connected to a rotatable shaft and configured to deform under axial displacement of the shaft. A sensor (80) maybe coupled with the at least one beam (65*a*) and configured to produce an output signal related to the axial displacement of the shaft. The beam may be retained between two bearings (74) of the rotatable shaft at a first end, and fixed to the housing (120) of the mechanical control device at a second end. The first end of the beam (65*a*) may displace axially with the rotatable shaft. The beam (65*a*) may comprise a discrete segment of a uniform width and thickness.

19 Claims, 5 Drawing Sheets

45

U.S. PATENT DOCUMENTS 5,419,203 A * 5/1995 Carmichael ............... 73/861.58
5,503,045 A 4/1996 Riester

OTHER PUBLICATIONS

International Search Report for PCT/US06/08030, dated Oct. 24, 2006, 3 pages.

International Written Opinion for PCT/US06/08030, dated Oct. 24, 2006, 5 pages.

International Preliminary Report on Patentability PCT/US06/08030, dated Sep. 9, 2008, 7 pages.

* cited by examiner

LOAD MEASUREMENT METHOD AND DEVICE

TECHNICAL FIELD

The present invention relates to a method and device for load measurement, and, more specifically, to an axial load measurement on a mechanical control device having a rotating shaft, for example, a valve actuator for fluid flow control devices. The load measurement may be used to derive a torque measurement.

BACKGROUND

Fluid flow control devices include devices for both liquids and gases. Valve actuators for fluid flow control devices are known and may be mechanically operated. For example, the valve actuator may be manually driven, operated by fluid pressure in which the shaft is connected directly or indirectly to a fluid operated piston, or be driven by an electro-hydraulic or electro-fluid means. Conventional valve actuators comprise an electrically driven input shaft, which may be rotatable at relatively high speeds with relatively low torque. The input shaft may, through reducing gears such as a worm gear or a helical screw thread and nut, rotate a relatively high torque, low speed output shaft.

It may be desirable to determine the torque generated by the output shaft. For example, when a valve is fully closed and seated, the torque required to open the valve may be considerably higher. Consistently monitoring the torque may indicate if a valve is wearing out or sticking. Trending patterns in the torque measurements may enable predictive maintenance. Override shut-off features may be provided if a torque exceeds a predetermined allowable level.

Measurement of the axial force on the input shaft may be used to determine the torque delivered by the output shaft. The axial load multiplied by the worm gear pitch radius is the torque delivered by the output shaft.

Conventional devices for measuring the end thrust or torque of a rotating shaft are known and include a thrust-torque transducer described in U.S. Pat. No. 4,182,168 to Desch. The thrust-torque transducer includes a LVDT (Linear Voltage Differential Transformer) having a movable core axially aligned with, secured to, and rotatable with the shaft, and producing an output signal corresponding to thrust or torque. However, in order to provide for operation of the transducer in both clockwise and counterclockwise rotations of the shaft, the Desch thrust-torque transducer requires presetting of a diaphragm of a thrust bearing. The Desch thrust-torque transducer does not detect any misalignment of the axial load on the shaft.

Another conventional device for indicating loading on a shaft is described in U.S. Pat. No. 5,503,045 to Riester. An increased load on a worm causes axial shifting of a worm shaft and an accompanying deformation of a membranous disc mounted on the worm shaft. One side of the disc is formed with a circumferentially extending, annular recess. The central portion of the disc is fixed against axial displacement relative to the worm shaft by an axial bearing situated on one side of the disc and a bushing which is disposed on the opposite side of the disc. A strain measuring strip on another side of the disc generates changes in measurements with displacement of the worm shaft. The device of Riester does not provide a method for detection of any misalignment of the load on the shaft.

Therefore, it would be advantageous to develop a technique for measuring the torque generated by an output shaft using the axial displacement of an input shaft, and detecting any misalignment of the load on the input shaft.

DISCLOSURE OF THE INVENTION

The present invention, in a number of representative embodiments, provides a load measurement method and device which may be used to determine a load including, but not limited to, the load on a rotating shaft. A mechanical control device having a rotating shaft, for example, a valve actuator for fluid flow control devices, may include a load measurement device of the present invention.

In accordance with one embodiment of the present invention, a mechanical control device includes a shaft configured for rotation, a beam operatively connected to the shaft and configured to deform under axial displacement of the shaft, and a sensor coupled with the at least one beam and configured to produce an output signal proportional to the axial displacement of the shaft. The beam may have a substantially uniform cross-section through substantially its entire length.

The mechanical control device may additionally include bearings for translating the axial displacement of the shaft to the beam. The bearings may include a first annular bearing disposed about the shaft and contacting a first surface of the beam, and a second annular bearing disposed about the shaft and contacting a second, opposing surface of the beam. Additionally included in the mechanical control device may be an annular body encircling the shaft, with the beam extending outwardly from the shaft toward the annular body. A portion of the beam may be fixed to the annular body. A housing may be fixed to the annular body, and configured for axial movement of the shaft relative to the housing.

The output signal of the sensor of the mechanical control device may identify any misalignment of the worm shaft. The sensor may include at least one strain gauge. The beam of the mechanical control device may include a metal, and may also include an array of discrete beams arranged in a spoke formation about the shaft.

In accordance with another embodiment of the present invention, a load sensor for measuring the axial load on a rotatable shaft includes at least one deflection beam having a first end portion thereof retained between two bearings, each bearing operatively connected to the rotatable shaft for translating axial movement of the shaft to the at least one deflection beam (as a deflection), and a sensor operatively connected to the at least one deflection beam and configured for measuring the deflection of the at least one deflection beam.

The sensor may comprise at least one stain gauge and the at least one deflection beam may comprise a discrete metal segment having a substantially uniform width and thickness therethrough. The at least one deflection beam may include a second end portion fixed to a housing for the load sensor, the housing being configured to enable relative axial displacement of the rotating shaft with respect thereto.

The load sensor may additionally include an annular body encircling the rotatable shaft. The at least one deflection beam may include an array of deflection beams arranged in a spoke formation about the shaft, extending outwardly from the shaft toward the annular body, wherein a second portion of each deflection beam is fixed to the annular body. A housing may be fixed to the annular body, the shaft being configured for axial movement relative to the housing. Each deflection beam of the array of deflection beams may include a sensor operatively connected thereto, each sensor being in communication with an output device, which relates any misalignment of the worm shaft.

In yet another aspect, the present invention includes a method of measuring a torque delivered to a valve. A rotatable shaft may include two bearings operatively coupled to the rotatable shaft. The method includes providing at least one beam disposed between the two bearings on a first end and coupled to a fixed housing on a second end, rotating a worm gear with the shaft, the worm gear being operatively coupled with a worm wheel and shaft driving the valve, and transmitting the torque delivered to the valve into axial movement of the rotatable shaft. The method additionally includes deflecting the at least one beam with the axial movement of the shaft, which is translated to the beam with the axial displacement of the two bearings, sensing the deflection of the at least one beam, determining an axial load on the shaft using the deflection of the at least one beam, and determining the torque delivered to a valve using the axial load on the shaft and a radius of the worm gear.

In particular embodiments of the invention, providing at least one beam may comprise providing a beam of a substantially uniform width and thickness therethrough, or alternatively may comprise providing an array of beams arranged in a spoke formation about the rotatable shaft. Sensing the deflection of the at least one beam may comprise independently sensing the deflection of each beam of the array of beams.

The features, advantages, and alternative aspects of the present invention will be apparent to those skilled in the art from a consideration of the following detailed description taken in combination with the accompanying drawings.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Although the foregoing description contains many specifics, these should not be construed as limiting the scope of the present invention, but merely as providing illustrations of some representative embodiments. Similarly, other embodiments of the invention may be devised that do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims, are to be embraced thereby.

Figure 1A:
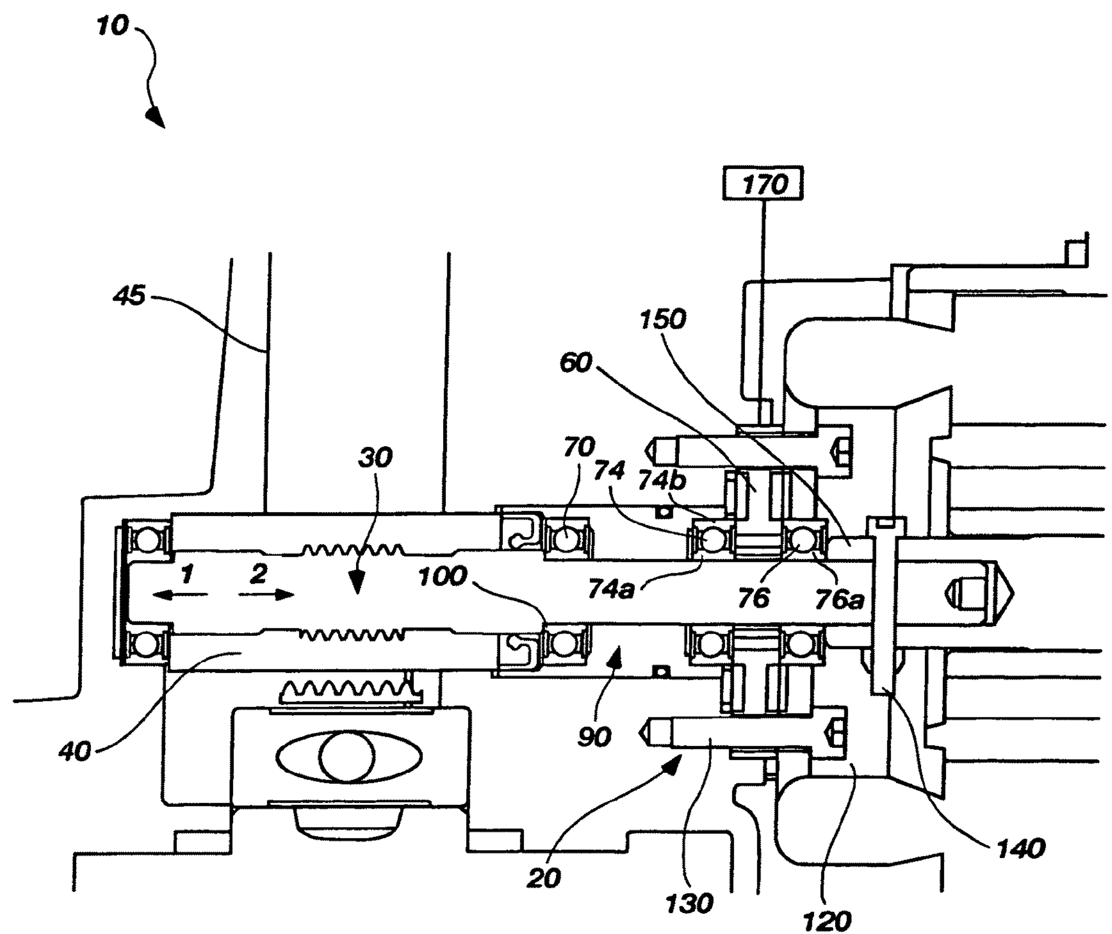
FIG. 1A is a cross-sectional view of a mechanical control device and torque measurement device of the present invention.

FIG. 1A illustrates a cross-section of an embodiment of a mechanical control device 10 including a torque measuring device 20 of the present invention. The mechanical control device 10 may comprise a valve actuator and may be operated, by way of example, manually, by a motor, or by fluid pressure. The mechanical control device 10 comprises a rotor 150, which drives the worm shaft 30 coupled to a worm gear 40. The worm gear 40 drives and is operatively connected to an output shaft 45. As the worm shaft 30 is rotated to drive the worm gear 40, the force required to drive the worm gear 40 and output shaft 45 may cause an axial displacement of the worm shaft 30 relative to a housing 120 of the mechanical control device 10. The axial movement may be registered with a plate 60. A portion of the plate 60 may be fixed to the housing 120, preventing axial movement thereof. Another portion of the plate 60 may deflect with the axial displacement of the worm shaft 30, transferred by a ball bearing 74, 76.

Figure 2:
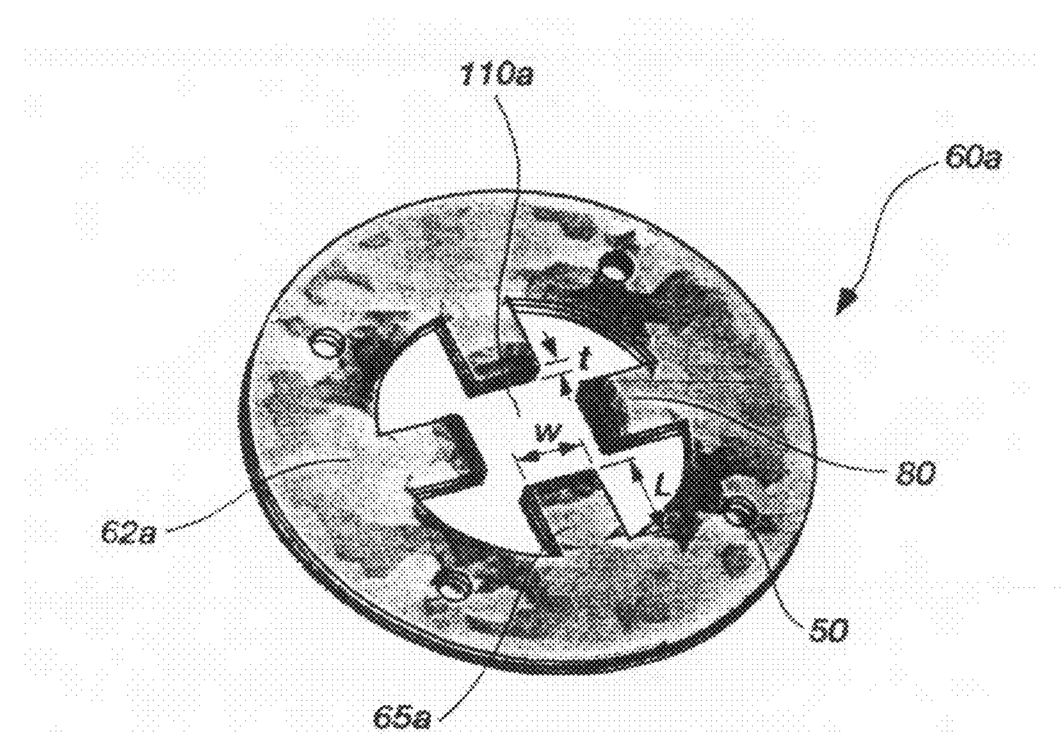
FIG. 2 is a view of one embodiment of a plate of a torque measurement device of the present invention.

The deflection of the plate 60 may cause a significant strain therein, which may, in turn, be measured using a sensor 80 (see FIG. 2). The sensor 80 may have an output that may be translated into the axial load on the worm shaft 30. The axial load, when multiplied by the worm gear pitch radius, is the torque delivered by the worm gear 40 to the output shaft 45. The axial movement of the worm shaft 30 may occur in either direction, depending on the direction of rotation of the worm shaft 30 and subsequent rotation of the output shaft 45. An output device 170 may be provided to display information such as, by way of example, the strain of the plate 60, the axial load of the worm shaft 30, and/or the torque on the output shaft 45.

Figure 1B:
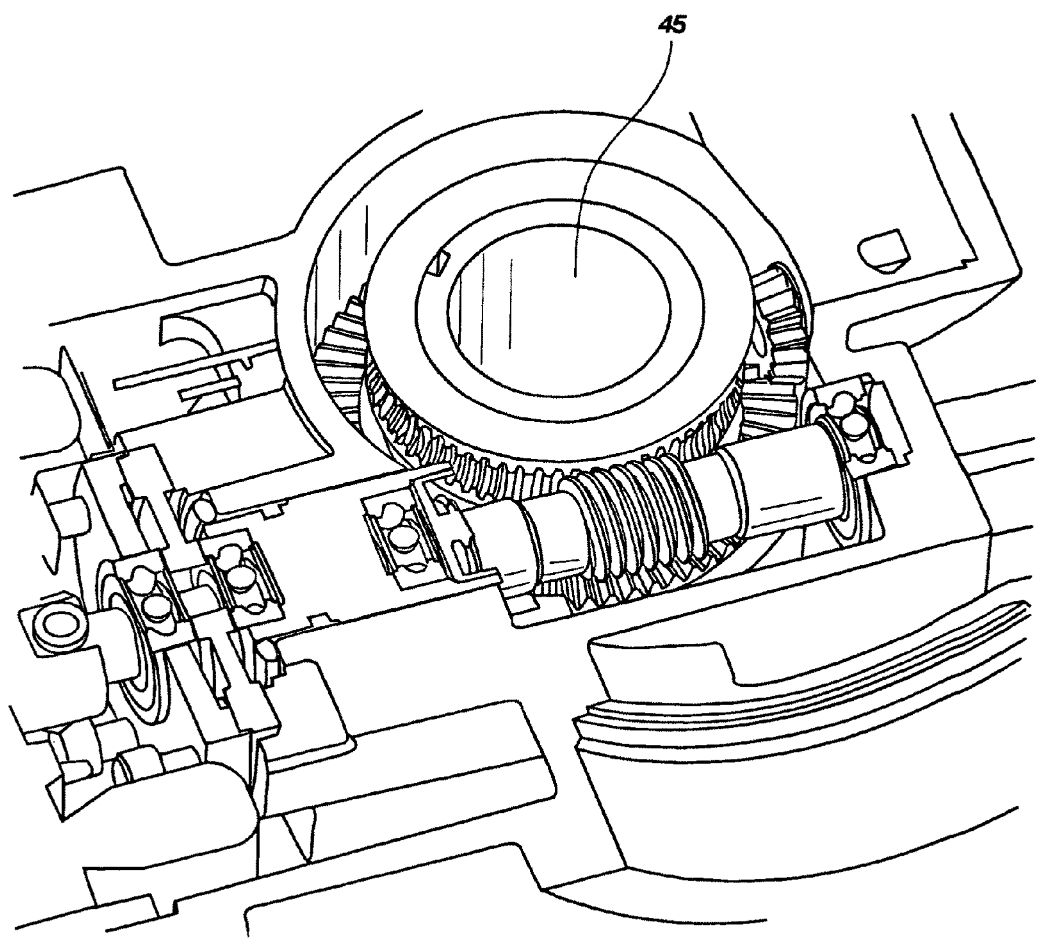
FIG. 1B is a perspective view of the mechanical control device and torque measurement device of FIG. 1A

The worm shaft 30 shown in FIG. 1A rotates within a sleeve 90 on bearings 70, 74, and 76, which, by way of example, can include ball bearings. A perspective view is shown in FIG. 1B. Driving the worm gear 40, which in turn drives the output shaft 45, applies an axial load on the worm shaft 30. The axial load forces the worm shaft 30 to displace axially. The worm shaft 30 may be displaced in two opposing axial directions, shown by arrows 1 and 2, and the plate 60 may be deflected toward two different positions. During rotation, the worm shaft 30 may be displaced to the left, as shown by arrow 1. The axial load may be transferred to the plate 60 via the rotor 150. An attachment element 140 secures the worm shaft 30 to the rotor 150. The attachment element 140 may comprise, for example, a bolt or a screw. The worm shaft 30 pulls on the attachment element 140. The attachment element 140 causes the rotor 150 to axially displace with the worm shaft 30 and the rotor 150 presses against the bearing 76. The bearing 76 pushes on the plate 60, causing the plate to deflect toward a first flexed position. An inner race 76*a* of the bearing 76 is flush with, and rotates with, the worm shaft 30. An outer race 76*b* of the bearing 76 contacts and pushes on the plate 60. The plate 60 does not rotate since the outer circumference of the plate 60 is fixed to the housing 120 with attachment elements 130. A sensor 80 may determine the strain on the plate 60 to determine the axial load on the worm shaft 30.

Alternatively, the worm shaft 30 may rotate in the opposite direction, turning the output shaft 45 in the opposite direction. The worm shaft 30 is thus axially loaded to the right, in the direction of arrow 2. The worm shaft 30 is displaced to the right and a shoulder 100 of the worm shaft 30 may press against the bearing 70. The shoulder 100 comprises a radial face of the worm shaft 30 at a junction of a portion of the worm shaft 30 having a smaller diameter and a portion of the worm shaft 30 having a larger diameter. The bearing 70 presses against the sleeve 90, causing matching axial displacement of the worm shaft 30 and the sleeve 90. The sleeve 90 and the bearing 74 thus undergo substantially the same axial displacement as the worm shaft 30, forcing the bearing 74 against the plate 60, and causing the plate to deflect toward the second flexed position. An inner race 74*a* of the bearing 74 is flush with, and rotates with, the worm shaft 30. An outer race 74*b* of the bearing 74 contacts the sleeve 90 and the plate 60, transmitting the axial load thereto. The first flexed position of the plate 60 may correspond to a closing force being applied to the valve (not shown) via the mechanical control device 10, and the second flexed position may correspond to an opening force being applied to the valve, or vice versa, depending on the direction of the threads of the worm shaft 30 and the configuration of the valve in communication with the valve actuator.

The sleeve 90, as depicted, does not rotate with the worm shaft 30. However, it is understood that a sleeve which rotates in conjunction with the worm shaft 30 is within the scope of the present invention. In addition, it is within the scope of the present invention to include a second sleeve about the worm shaft 30, between the rotor 150 and the bearing 76. Thus, a sleeve (and not the rotor 150) may transmit the axial load to the plate 60 from the worm shaft 30 when experiencing an applied load in the direction of arrow 1.

An axial bearing may be positioned between the rotor 150 and the device operating the mechanical control device 10, such as a motor, enabling the rotor 150 to move axially relative to the operating device. Thus, any outside axial forces on the operating device may also be absorbed with the axial bearing and do not affect the measurement of the axial load.

FIG. 2 depicts a plate 60*a* according to a particular embodiment of the present invention. The plate 60*a* is substantially planar, comprising an annular body 62*a* and an array of four discrete inwardly protruding beams 65*a*. Each beam 65*a* may have a substantially rectangular cross-section may be disposed at a right angle to each adjacent beam 65*a*. The annular body 62*a* and the inwardly protruding beams 65*a* may be contiguous, formed from a single piece of material, such as, for example, a metal disc. For example, the plate 60*a* may be formed by stamping, forging, or laser cutting. Alternatively, the beams 65*a* may be attached to the annular body 62*a*, such as with an adhesive or an attachment element. The beams 65*a* may be formed of the same material as the annular body 62*a* or can be formed from a different material. By way of example, suitable materials for the annular body 62*a* and beams 65*a* include a metal, such as copper, aluminum, steel, stainless steel, or a polymer. The inwardly protruding beams 65*a* may be removable and replaceable.

The inwardly protruding beams 65*a* provide a passageway 110 for the worm shaft 30 (not shown in FIG. 2) to extend therethrough. The inwardly protruding beams 65*a* may be arranged in a spoke formation within the central opening of the annular body 62*a*. However, the beams 65*a* need not join at the center of the annular body 62*a* central opening; rather, the center may comprise the open passageway 110. The ends of the beams 65*a* distal from the annular body 62*a* are free to displace under the load of the axial displacement of the worm shaft 30, transferred by the bearings 74, 76. (See FIG. 1A.) Each beam 65*a* may have a substantially uniform thickness t and width w along the length l of the beam 65*a*.

FIG. 2 depicts (with shading) the strain under deflection on the annular body 62*a* and each beam 65*a* of the plate 60*a*. The darkly shaded portions represent the portions under the greatest strain, and the lighter shaded areas show the portions under less strain. The plate 60*a* is depicted with four apertures 50 through the annular body 62*a*, enabling the plate 60*a* to be secured to a housing 120 (see FIG. 1A) of the mechanical control device 10. Attachment elements 130, for example, bolts, pins, or screws, may be used to secure the plate 60*a*. The plate 60*a* may be secured by methods other than attachment elements, such as, for example, by brazing or welding.

During use, the motor may turn the worm shaft 30, which rotates the output shaft 45. The force causing the output shaft 45 to turn causes an axial movement of the worm shaft 30. The sleeve 90 on the worm shaft 30 also moves axially, pushing the bearings 74 against each beam 65*a* of the array. Each beam 65*a* flexes with the portion of the beam 65*a* that is in contact with the bearing being displaced with the axial movement of the shaft. The annular body 62*a* of the plate 60*a* is fixed to the housing and is not displaced. Thus, each beam 65*a* deflects or flexes, causing a strain therein. The strain within each beam 65*a* may be measured using a sensor 80. Each beam 65*a* may include a sensor 80 or, alternatively, only one beam may include a sensor 80.

Including a sensor 80 on a plurality of beams 65*a* of the array of beams enables independent measurements of the stress and/or strain on each of the plurality of beams 65*a*. Each beam 65*a* of the array of beams 65*a* is discrete and the array may surround the worm shaft 30. Each beam 65*a* may undergo the axial displacement of the worm shaft 30 at separate locations about the circumference of the worm shaft 30. Thus, if the worm shaft 30 bends or assumes any other misalignment of the axial load, the sensors 80 on each beam 65*a* may sense different measurements. Comparing the measurements further enables a determination of any misalignment of the axial load on the worm shaft 30. The sensors may be configured to cancel out any misalignment and to provide a signal corresponding to a reading incorporating any misalignment. Alternatively, a separate signal may be provided, warning of the misalignment.

Figure 3:
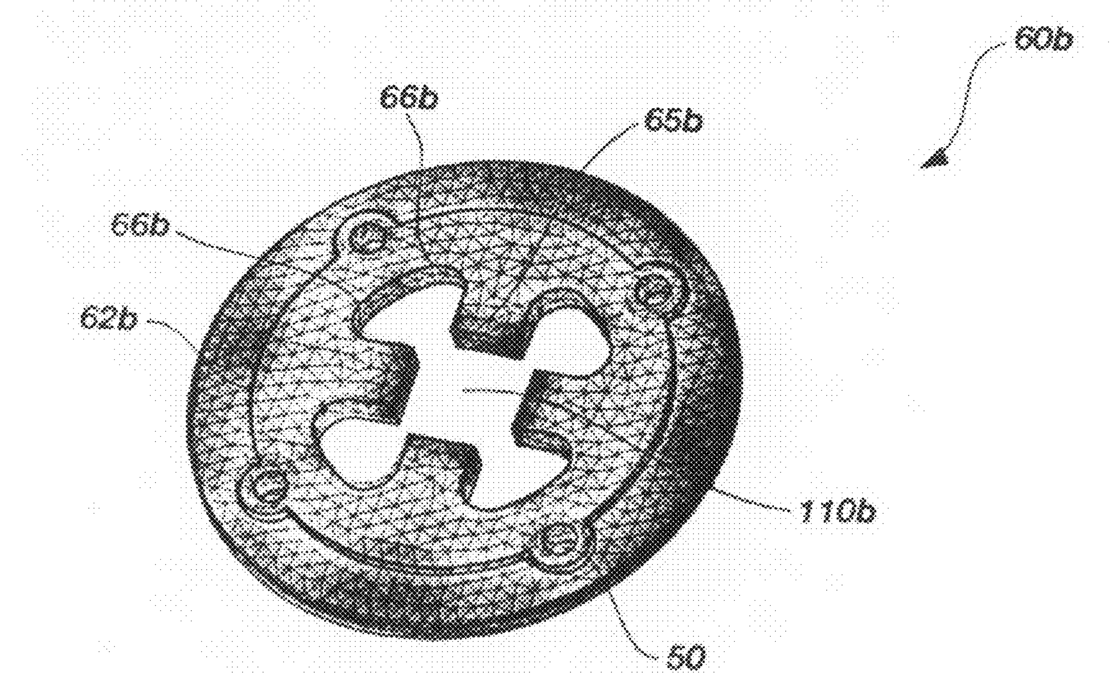
FIG. 3 is a view of another embodiment of a plate of a torque measurement device of the present invention.

FIG. 3 depicts another embodiment of a plate 60*b* according to the present invention. The plate 60*b* comprises a substantially planar annular body 62*b* having four discrete inwardly protruding beams 65*b*. Each beam 65*b* may have a substantially rectangular cross-section and may be disposed at a right angle to each adjacent beam 65*b*. Corners 66*b* at the junction of the annular body 62*b* and inwardly protruding beams 65*b* are chamfered. The chamfering may reduce the stress on the plate 60*b* at the corners 66*b*. The inwardly protruding beams provide a passageway 110 for the worm shaft 30 (not shown in FIG. 3) to extend therethrough. The plate 60*b* shows the stress under deflection of the annular body 62*b* and each beam 65*b* with shading. The darkly shaded portions represent the portions under the greatest stress, and the lightly shaded area shows the portions under less stress. The plate 60*b* is depicted with four apertures 50, enabling the plate 60*b* to be secured to a housing 120 (see FIG. 1A) of the mechanical control device 10. Attachment elements 130, for example, bolts or screws, may be used to secure the plate 60*b*.

Figure 4:
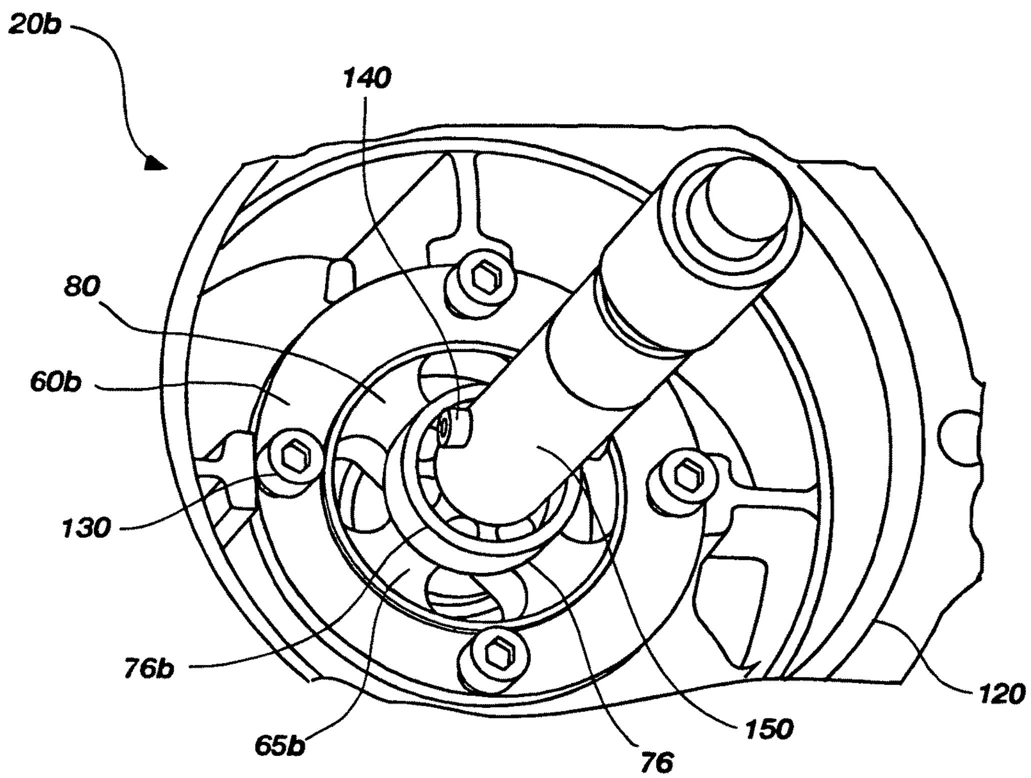
FIG. 4 is a perspective view of the plate of FIG. 3 installed in a representative load measurement device of the present invention.

FIG. 4 is a perspective view of the plate of FIG. 3 installed in a load measurement device 20*b* of the present invention. The rotor 150 protrudes from the center of the plate 60*b*. A portion of the worm shaft 30 is encased within the rotor 150 and secured thereto with attachment element 140. The bearing 76 encircles the worm shaft 30. A distal end of the rotor abuts the bearing 76, transmitting any axial load in the direction of arrow 1 (see FIG. 1A) thereto. The outside race 76*b* of the bearing contacts the surface of each beam 65*b* on a first portion distal from the annular body 62*b*. Each beam 65*b* may include a second portion secured to the annular body 62*b*, which does not undergo displacement since the annular body 62*b* is fixed to the housing 120. The first portions of the beams 65*b* displace with the bearing 76, while the second portions of the beams 65*b* are secured to the fixed annular body 62*b*. Thus, the beams 65*b* deflect or flex, which places the beam under a strain. The strain may be measured with a sensor 80, such as a strain gage.

Figure 5:
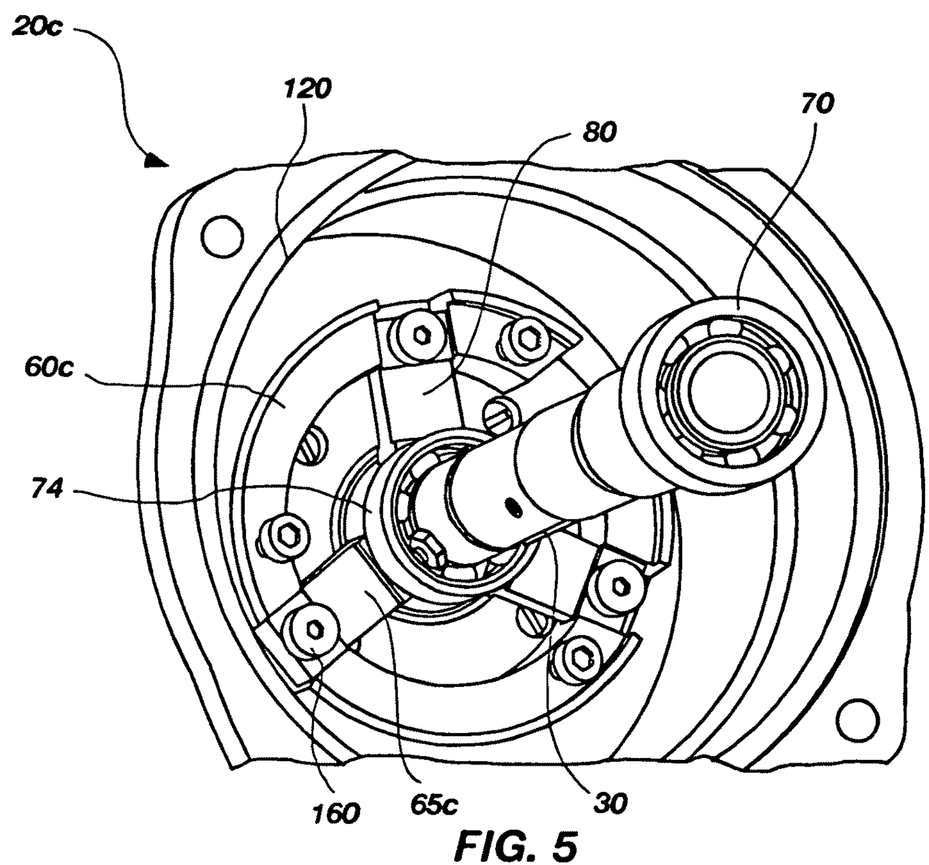
FIG. 5 is a perspective view of another embodiment of a load measurement device of the present invention.

FIG. 5 is a perspective view of a load measurement device 20*c* according to a particular embodiment of the invention. Plate 60*c* comprises an array of three discrete beams 65*c* disposed in a spaced-apart configuration, each beam 65*c* extending outwardly from the worm shaft 30. Although the present embodiment is shown with three beams 65*c*, it is understood that any number of beams 65*c* can be used. Each discrete beam may be secured to the housing 120 with an attachment element 160. Each beam 65*c* may have a sensor 80 mounted thereon or, alternatively, only one or two of the beams 65*c* may include a sensor 80. The sensor 80 may include a plurality of sensors disposed in a plurality of locations on the beam 65*c*. In one embodiment, the sensors 80 may be located in the areas of maximum strain. The beams 65*c* do not contact the worm shaft 30, however, any axial load applied to the worm shaft 30 may be transferred to the beams 65*c* via the bearing 74. The beams 65*c* do not completely encircle the worm shaft 30, rather, each beam 65*c* is separately spaced.

The beams 65*c* need not be secured to an annular body, such as the beams 65*a* and 65*b* depicted in FIGS. 3, 4, and 5. The beams 65*c* may each comprise an elongated body, having a substantially uniform cross-section therethrough. A first portion of each beam 65*c* may be free to axially displace with the worm shaft 30, under the axial load transferred by bearing 74. A second portion of each beam 65*c*, at an opposite end longitudinally from the first portion, may be secured to the housing 120 with an attachment element 160. The worm shaft 30 may be axially displaced relative to the housing 120 under the axial load. The first portion of each beam 65*c* may be displaced relative to the housing 120 with the worm shaft 30. The second portion of each beam 65*c* can be secured to the housing and can be prevented from being displaced. Thus, each beam 65*c* may deflect, causing strain therein. The strain may be measured with the sensor 80.

A plate 60 may include any number of beams 65*a*-65*c*. For example, the plate 60*b* depicted in FIG. 4 includes an array of four beams 65*b*, and the plate 60*c* depicted in FIG. 5 includes an array of three beams 65*c*. Additionally, a plate having only a single beam is within the scope of the present invention.

Measuring the direct reaction forces on internal components of a mechanical control device, such as the axial load on a worm shaft 30, is an accurate method of determining the torque that the mechanical control device is delivering to an output shaft. This measurement is independent of gear efficiency, gear speed, motor torque, and motor applied line power. A beam 65*a*, 65*b*, 65*c* of a load measurement device 20, 20*b*, 20*c* of the present invention may be formed so that the deflection caused by the axial load on the worm shaft 30 creates enough strain to obtain an electronic signal with the sensor 80, but not enough to cause a permanent strain or deflection to the beam 65*a*, 65*b*, 65*c*. The worm gear 40, driven by the worm shaft 30, may be a shell type or may be integral to the worm shaft 30.

Figure 6:
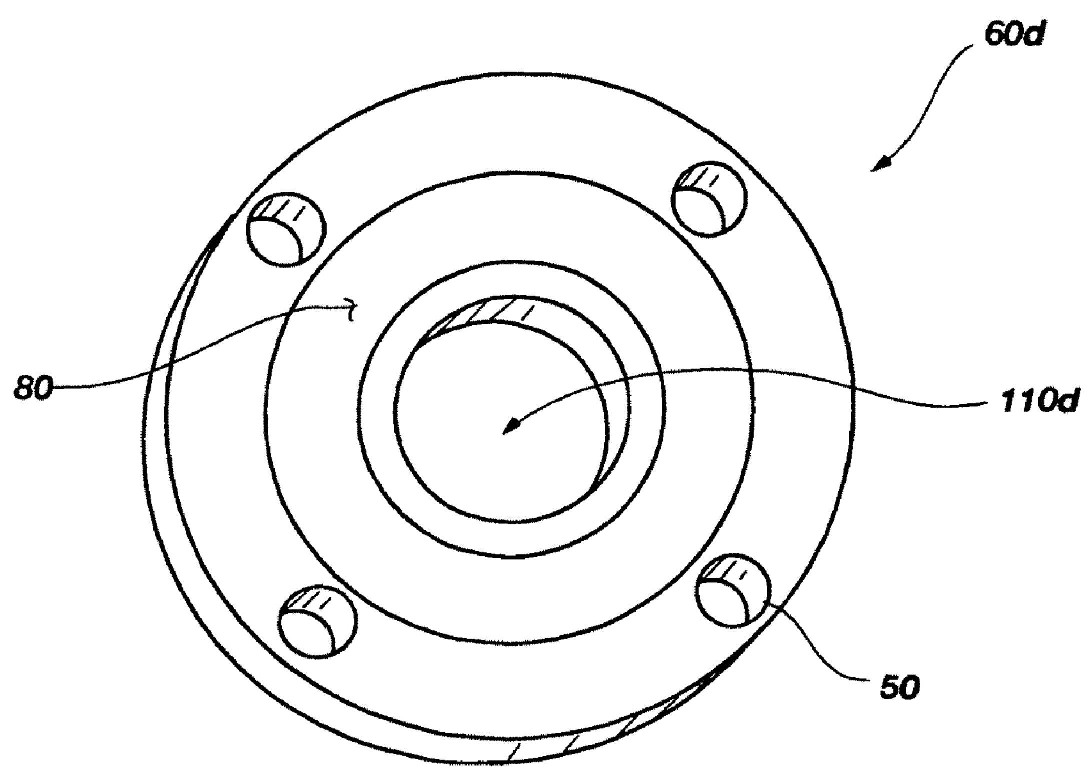
FIG. 6 is a view of yet another embodiment of a plate of a torque measurement device of the present invention.

FIG. 6 depicts a plate 60*d* according to a particular embodiment of the present invention. The plate 60*d* is annular, having a passageway 110*d* for the worm shaft 30 (not shown in FIG. 6) to extend therethrough. The annular plate 60*d* may be contiguous, formed from a single piece of material, such as, for example, a metal disc. For example, the plate 60*d* may be formed by stamping, forging, or laser cutting. By way of example, suitable materials for the plate 60*d* include a metal, such as copper, aluminum, steel, stainless steel or a polymer. The plate 60*d* may include apertures 50 therethrough, enabling the plate 60*d* to be secured to a housing 120 (see FIG. 1A) of the mechanical control device 10. A sensor 80 may be positioned in an area of maximum strain on the plate 60*d*, near an aperture 80.

Although the foregoing description contains many specifics, these are not to be construed as limiting the scope of the present invention, but merely as providing certain representative embodiments. Similarly, other embodiments of the invention can be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A mechanical control device comprising:
- a shaft configured for rotation;
- at least one beam operatively connected to the shaft and configured to deflect under axial displacement of the shaft; and
- a sensor coupled with the at least one beam and configured to produce an output signal proportional to the axial displacement of the shaft.

2. The mechanical control device of claim 1, wherein the at least one beam has a substantially uniform cross-section through an entire length of the at least one beam.

3. The mechanical control device of claim 1, further comprising bearings for translating the axial displacement of the shaft to the at least one beam.

4. The mechanical control device of claim 3, wherein the bearings comprise an annular bearing disposed about the shaft and contacting a first surface of the at least one beam, and another annular bearing disposed about the shaft and contacting a second, opposing surface of the at least one beam.

5. The mechanical control device of claim 1, further comprising:
- an annular body encircling the shaft, the at least one beam extending outwardly from the shaft toward the annular body, and a portion of the at least one beam fixed to the annular body; and
- a housing fixed to the annular body, the housing configured for axial movement of the shaft relative to the housing.

6. The mechanical control device of claim 1, wherein the output signal relates any misalignment of the shaft.

7. The mechanical control device of claim 1, wherein the sensor comprises at least one strain gauge.

8. The mechanical control device of claim 1, wherein the at least one beam comprises a metal.

9. The mechanical control device of claim 1, wherein the at least one beam comprises an array of discrete beams arranged in a spoke formation about the shaft.

10. A load sensor for measuring the axial load on a rotatable shaft, comprising:
- at least one deflection beam having a first end portion thereof retained between two bearings, each bearing operatively connected to the rotatable shaft for translating axial movement of the shaft to a deflection of the at least one deflection beam; and
- a sensor operatively connected to the at least one deflection beam and configured for measuring the deflection of the at least one deflection beam.

11. The load sensor of claim 10, wherein the sensor comprises at least one strain gauge.

12. The load sensor of claim 10, wherein the at least one deflection beam comprises a discrete segment of a substantially uniform width and thickness therethrough.

13. The load sensor of claim 10, wherein the at least one deflection beam comprises a metal.

14. The load sensor of claim 10, wherein the at least one deflection beam includes a second end portion fixed to a housing for the load sensor, the housing configured to enable relative axial displacement of the rotating shaft with respect thereto.

15. The load sensor of claim 10, further comprising:

an annular body encircling the rotatable shaft, the at least one deflection beam comprising an array of deflection beams arranged in a spoke formation about the shaft, extending outwardly from the shaft toward the annular body, wherein a second portion of each deflection beam is fixed to the annular body; and a housing fixed to the annular body, the shaft configured for axial movement relative to the housing.

16. The load sensor of claim 15, wherein each deflection beam of the array of deflection beams includes a sensor operatively connected thereto, each sensor in communication with an output device.

17. A mechanical control device comprising:

a shaft configured for rotation;

an annular plate operatively connected to the shaft and configured to deflect under axial displacement of the shaft; and a sensor coupled with the annular plate and configured to produce an output signal proportional to the axial displacement of the shaft.

18. The mechanical control device of claim 17, further comprising:

a central passageway through the annular plate; and at least one circumferentially positioned aperture through the annular plate.

19. The mechanical control device of claim 18, wherein the sensor is positioned on the annular plate radially between the central passageway and the at least one circumferentially positioned aperture.

* * * * *